US008189008B2

(12) United States Patent
Julio

(10) Patent No.: US 8,189,008 B2
(45) Date of Patent: May 29, 2012

(54) COLOR CONTROL INTUITIVE TOUCHPAD

(76) Inventor: Daniel John Julio, Boulder, CO (US)

( * ) Notice: Subject to any disclaimer, the term of this patent is extended or adjusted under 35 U.S.C. 154(b) by 771 days.

(21) Appl. No.: 12/332,195

(22) Filed: Dec. 10, 2008

(65) Prior Publication Data
US 2009/0153352 A1 Jun. 18, 2009

Related U.S. Application Data

(60) Provisional application No. 61/013,348, filed on Dec. 13, 2007.

(51) Int. Cl.
G06K 9/40 (2006.01)
G06T 15/50 (2006.01)
G09G 5/10 (2006.01)
H04N 5/57 (2006.01)
H04N 9/73 (2006.01)
H04N 1/46 (2006.01)
G03F 3/08 (2006.01)

(52) U.S. Cl. ........ 345/581; 345/426; 345/170; 345/173; 345/690; 348/602; 348/655; 348/687; 348/703; 358/509; 358/518; 358/520; 382/167; 382/254; 382/274; 340/815.43

(58) Field of Classification Search .................. 345/418, 345/426–428, 581, 589–591, 77, 606, 156, 345/617–619, 170, 173, 204–207, 690, 84–89; 348/602–603, 649, 655, 687, 703; 358/509, 358/525, 518–520; 382/165–167, 254, 274, 382/276; 340/870.01, 908, 995.1, 995.14, 340/995.16, 815.4, 815.43, 815.75
See application file for complete search history.

(56) References Cited

U.S. PATENT DOCUMENTS 1,991,751 A 4/1933 Kennedy
D108,940 S 7/1937 Gabb
2,332,847 A 10/1943 Franke
(Continued)

FOREIGN PATENT DOCUMENTS

JP 2001-351788 A 12/2001
(Continued)

OTHER PUBLICATIONS

Picture: A Hewlett-Packard iPaq Personal Digital Assistant (PDA) running a control program to allow the user to select the color and White Color Temperature (in degrees Kelvin) of a Renaissance Lighting Company Light-Emitting Diode (solid-state) light fixture. 1 page.

(Continued)

Primary Examiner — Wesner Sajous
(74) Attorney, Agent, or Firm — Patent Law Offices of Rick Martin

(57) ABSTRACT

A method and apparatus whereby a two-dimensional touchpad control for selecting color is implemented via a touch sensitive surface with a graphical attachment on its surface to select both an intensity and a color. The graphical attachment having two regions, one region being a rectangular shape to select the intensity via a Y-axis and the other being a two dimensional X/Y-axis control surface with color Hue on one axis and color Saturation on the other axis. Software running in a control device monitors touchpad regions for user inputs and converts the raw selected parameters on the touchpad into the Hue, Saturation and Intensity information, used in the preferred embodiment to control light fixture color and intensity.

13 Claims, 16 Drawing Sheets

U.S. PATENT DOCUMENTS

| | | | |
|---|---|---|---|
| D277,722 S | 2/1985 | Gusrud | |
| D283,762 S | 5/1986 | Caruso | |
| D286,346 S | 10/1986 | Woods | |
| 4,947,302 A | 8/1990 | Callahna | |
| D326,578 S | 6/1992 | Kaye | |
| D344,313 S | 2/1994 | Wu | |
| 5,909,211 A | 6/1999 | Combs et al. | |
| 6,074,001 A | 6/2000 | Yates | |
| D430,240 S | 8/2000 | Chang | |
| D433,854 S | 11/2000 | Diffrient | |
| 6,392,368 B1 | 5/2002 | Deller et al. | |
| D460,299 S | 7/2002 | Lundsgaard | |
| D463,143 S | 9/2002 | Riddle | |
| 6,608,617 B2 | 8/2003 | Hoffknecht et al. | |
| 6,672,660 B2 | 1/2004 | Hoshino | |
| 6,709,052 B2 | 3/2004 | Jalkanen | |
| 6,909,419 B2* | 6/2005 | Zavracky et al. | 345/102 |
| D526,031 S | 8/2006 | Corbalis et al. | |
| 7,209,116 B2 | 4/2007 | Gates et al. | |
| 7,319,298 B2 | 1/2008 | Jungwirth et al. | |
| 7,355,523 B2 | 4/2008 | Sid | |
| 2002/0067144 A1 | 6/2002 | Hoffknecht et al. | |
| 2002/0163231 A1 | 11/2002 | Hoshino | |
| 2004/0156203 A1 | 8/2004 | Hata | |
| 2005/0066370 A1 | 3/2005 | Alvarado et al. | |
| 2005/0231134 A1 | 10/2005 | Sid | |
| 2006/0034042 A1* | 2/2006 | Hisano et al. | 361/681 |
| 2007/0230159 A1 | 10/2007 | Cortenraad et al. | |
| 2010/0077401 A1* | 3/2010 | Brant et al. | 718/104 |
| 2010/0289835 A1* | 11/2010 | Holub | 345/690 |

FOREIGN PATENT DOCUMENTS

| | | |
|---|---|---|
| JP | 2001-351788 A1 | 12/2001 |
| KR | 10-2006-0050614 A | 5/2006 |
| KR | 10-2006-0050614 A1 | 5/2006 |

OTHER PUBLICATIONS

Picture: The front control surface of the Philips LivingColors solid-state decorative light fixture handheld remote control. The image shows a hue wheel and saturation and intensity rocker buttons to allow the user to select the color output by the light fixture. 1 page.

PhilipsLivingColors User Manual: www.philips.com/livingcolors; A scan of the User Manual for the Philips LivingColors solid-state decorative light fixture. The user manual shows the various components of the light fixture, how to configure it and how to use the handheld remote to control it. 2 pages.

http://www.biyee.net/v/cie_diagrams/index.htm: 1931 CIE Chromaticity Diagram, p. 1 of 1.

http://www.ugrad.cs.ubc.ca/~cs314/Vjan2008: University of British Columbia, CPSC 314 Computer Graphics, Jan.-Apr. 2008, Tamara Munzner, Color II, Lighting/Shading 1, Week 7, Mon., Feb. 25, 2008, 43 pages. See pp. 9 and 15.

http://www.silcom.com/~pelican2/PicoDopp/WINDOPP_MORE.html: Doppler DF Instruments: More WinDopp Display Info, "More WinDopp Display Program Information", Nov. 24, 2008, 10 pages. See p. 9.

* cited by examiner

COLOR CONTROL INTUITIVE TOUCHPAD

CROSS REFERENCE APPLICATIONS

This application is a non-provisional application claiming the benefits of provisional application No. 61/013,348 filed Dec. 13, 2007.

FIELD OF INVENTION

The present invention relates to the area of controlling color-capable lighting units, whereby a two-dimensional touchpad control for selecting color (hue and saturation) and intensity is implemented via a touch sensitive surface with a graphical attachment on its surface for user selection of both intensity and a color. Software running in a control device converts the selected parameters on the touchpad to a specific color and intensity in a fixture(s).

BACKGROUND OF THE INVENTION

Lighting devices have long had the ability to be dimmed. Dimming is essentially a one-dimensional problem. Only a single control, typically implemented as a dial or slider, is necessary to control the intensity of light. The introduction of color-capable lights such as light emitting diodes (LEDs) presents a more complex set of issues to solve when developing controls for them.

Typically these lights are made up of red, green and blue (RGB) emitters that can combine to create any shade of color. Light emitting diodes (LEDs) lend themselves as almost perfect emitters. They are low power, long lasting and easy to control. With more usage, their cost has been lowered dramatically. There are many companies producing light fixtures utilizing RGB LEDs to create colored light. The vast majority of these light fixtures use a communication interface called DMX-512 to receive command information from a central light controller. DMX-512 has its origins in the stage lighting industry and has its own installation and safety requirements. DMX-512 is a standard protocol by means of which theatre lighting control desks can communicate with lighting equipment. It was designed to allow equipment from different companies to be used together easily. Originally developed to control lighting dimmers, it is now used to control color scrollers, moving lights, smoke machines and almost any equipment that can be controlled digitally.

Originally designed to control single color lights it associated a single light to a single slider control on a control panel. Three or more sliders on the control panel typically control color capable lights (i.e. LEDs) today. In the simplest form of control there is one slider for each of the red, green and blue channels. It is up to the user to understand how much of each primary color to set to get a particular color. More complex controllers use built in software programs that understand the characteristics of each light fixture attached to the controller to select colors. DMX-512 light controllers are typically expensive, ranging from the low hundreds of dollars to tens of thousands of dollars. Selecting a specific color is not intuitive.

LEDs emit a very narrow band of light spectra. As a result colors mixed from red, green and blue LEDs may have a non-natural look to the human eye, especially as the colors selected become less saturated (more white). Light manufacturers are including additional colored and white LEDs to improve color fidelity and rendering index. These fixtures require adding additional color channels when mapped to a DMX-512 interface increasing control complexity and cost. For example, setting a specific shade of pink by directly controlling red, green, blue, yellow and white sliders become a challenge.

To date this problem has been manageable because commercial installations can absorb the cost of expensive DMX-512 controllers, and lighting control personnel are capable of controlling complex lights. However as color-capable lights move into the residential arena, the current industry has few intuitive ways for homeowners to control these sophisticated lights.

Typical methods today include:
  Direct red, green, blue color control;
  Preprogrammed colors, usually selected by button or color dial;
  Presets which must be programmed using an external computer; or
  Computer programs requiring access to a computer.

The most sophisticated systems on the market today include:
  Philips® LivingColors light with a remote control presenting a color wheel
  Renaissance® Lighting PDA touchscreen control One color model that is more intuitive than most is the Hue-Saturation-Value (HSV) model or sometimes known as the Hue-Saturation-Intensity (HSI) model. It is a three-dimensional color model. One axis controls the color's hue (or actual color value). The hue is generally the single word that we would use to describe a 'composite' color. A second axis controls the color's saturation. Saturation specifies how pure the color is. A fully saturated color has no white component in it. White is the unsaturated value. A pure red is fully saturated. Pink is a less saturated red. The third axis controls the intensity of the light.

The hue, saturation and brightness of a light beam are often specified using a three-dimensional HSV or HSI color tree (color space), as shown in FIG. 1. The tree represents one horizontal slice of the total color spectrum represented by a cylinder. The vertical axis 10 of the tree specifies the intensity (lightness) of the beam, from nothing at the bottom (that is, black 12) through gray 14 to some maximum value 16 at the top corresponding to the brightest possible white. At each level of the tree (which corresponds to a given lightness or brightness), we draw a hue circle 18 whose circumference shows the various pure, fully saturated, monochromatic colors of the rainbow in wavelength order from red to violet. The shown Hue circle 18 represents but one slice of a cylinder going from black 12 at the bottom to the maximum value 16 or brightest value at the top. The points on a radius line from the center of the tree to some point on the circumference represent saturation via different unsaturated colors formed by mixing some amount of white from the center of the tree with some amount of the color at the end point of the line. These color models are implemented in many computer systems for use by graphic artists when modifying images. As shown in FIG. 1, pink is a mixture of red and white, and the hue of the mixture is still red. Mixtures of yellow and white would produce colors that we would still call yellow, but which also might be described as "cream" white, "warm" white, etc.

The problem is to easily control a light's intensity and color. Although mathematically color may be specified a number of ways, a control interface must present an intuitive and simple model for a user. Controlling individual color channels is not intuitive. In addition a control system should be independent of the lighting system it controls. This allows the lighting system to implement color generation with any mechanism. Finally, a control system should be low-cost to implement.

The present invention solves these problems as will be described herein using a two dimensional touchpad or touch screen. In a home this mini touchpad could be a wall mounted device.

SUMMARY OF THE INVENTION

The primary aspect of the present invention is to provide an intuitive method of selection of a specific color, hue, and saturation for controlling a set of lights.

Another aspect of the present invention is to provide a color control that is user friendly for ease of lighting selection and control.

Another aspect of the present invention is to provide for control of complex color lighting systems having a plurality of installations, groups and individual light units.

Another aspect of the present invention is to provide for an intuitive color lighting control solution that is implementable over a variety of platforms including in-wall control units, remote control handheld units, general computing systems, PDAs and the like.

Another aspect of the present invention is to provide a touchpad color solution with an area for Color selection with Hue and Saturation and a second area for Intensity.

Yet another aspect of the present invention is to provide for a low-cost method of lighting color control.

Another aspect of the present invention is to produce a Hue, Saturation, Intensity output packet based on touchpad user selection.

Other aspects of this invention will appear from the following description and appended claims, reference being made to the accompanying drawings forming a part of this specification wherein like reference characters designate corresponding parts in the several views.

The present invention integrates a graphic with a touch sensitive surface (pad or screen) to make a two-dimensional control. For this invention the term 'touchpad' and the term 'touch pad' both refer to one and the same. The invention combines a color model (HSV/HSI) with a simple computer touchpad to create an intuitive, low-cost and easy-to-use control for color capable lights such as LEDs. It is organized so that it can easily control complex lighting installations. It can also control the intensity of traditional white lights enabling one device to handle any lighting control task.

The present invention provides a method of color control and selection consisting of:
  a touchpad having a touch sensitive surface and a color graphical overlay;
  said overlay having two distinct regions, one a two dimensional color region and the other an intensity selection region;
  the two dimensional color region allowing a user to select a precise color including color Hue and Saturation;
  the intensity selection region allowing a user to select a color intensity; and
  said touchpad connected to a micro-controller having software to convert selected parameters from the touchpad regions into HSI/HSV color space.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 2A:
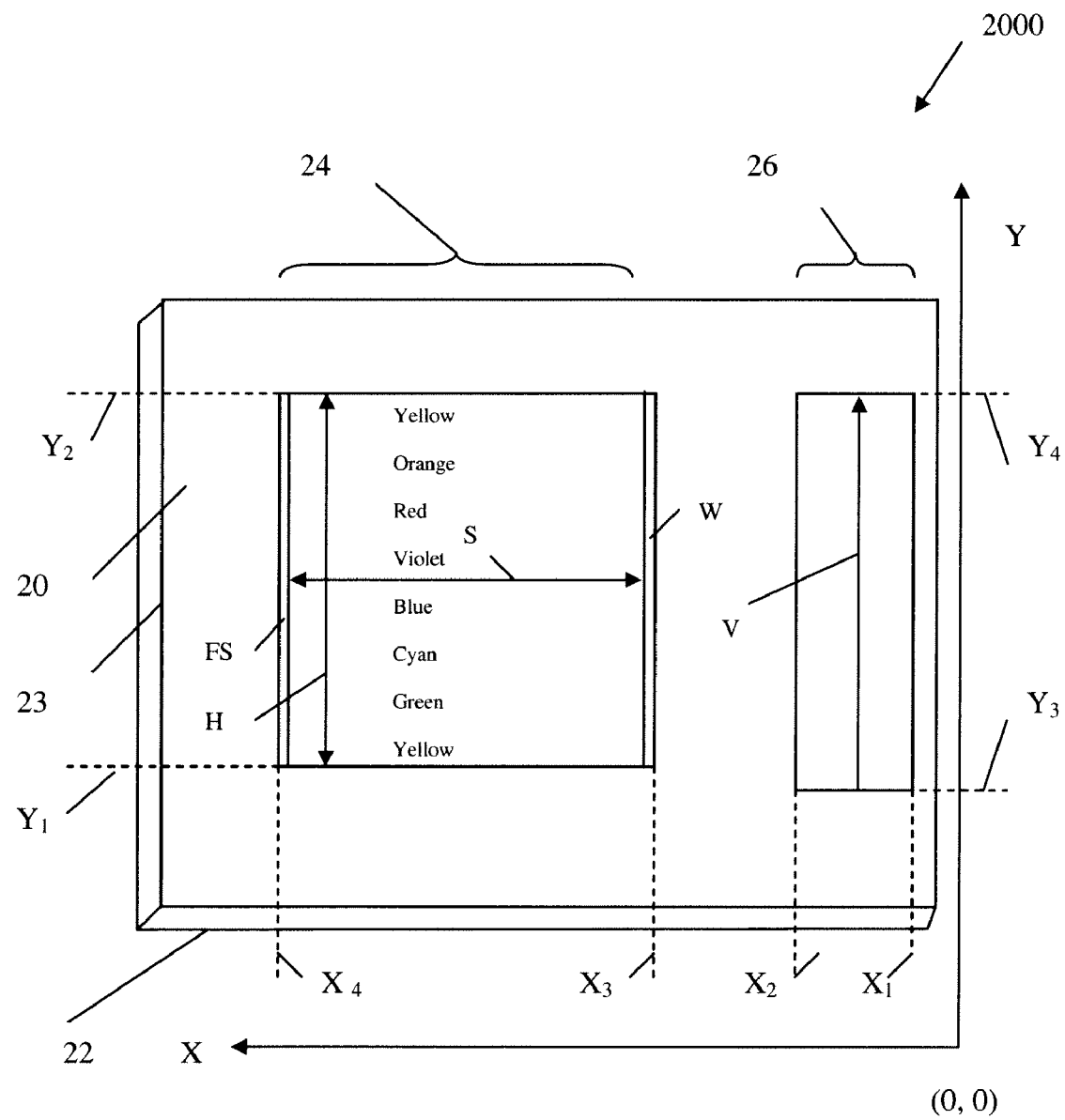
FIG. 2A is a front perspective drawing showing touchpad assembly having a color graphic integrated with a touchpad.

FIG. 2A is a front perspective drawing showing touchpad assembly 2000 having a color spectrum/intensity graphic 20 integrated with touchpad 22. The present invention integrates color graphic 20 with a touch sensitive surface 23 on a typical touchpad 22 to make a two-dimensional control as shown in FIG. 2A. Color spectrum/intensity graphic 20 can be manufactured with a film type material, which can be adhered to the surface of an industrial supplied touchpad 22. The invention combines color model (HSV/HSI) with a computer touchpad 22 to create an intuitive, low-cost and easy-to-use control for color capable lights. Touchpad assembly 2000 is organized so that it can easily control complex lighting installations. Touchpad assembly 2000 can also control the intensity of traditional white lights enabling one device to handle any lighting control task.

The preferred embodiment of the present invention consists of touchpad device 22, similar to the kind in most laptop computers or other electronic devices with color spectrum/ intensity graphic 20 attached to its surface 23. Examples of existing touchpads are the Cirque TSM9910 or TSM9957 having Serial and PS/2® communication protocols. The surface of the touchpad is divided into two rectangular areas. Area 24 represents the full color spectrum (lying between $X_3$ and $X_4$ on the X-axis and between $Y_1$ and $Y_2$ on the Y-axis) with full-spectrum color Hue H as the vertical Y-axis and Saturation S as the horizontal X-axis. Saturation increasing from right to left with fully saturated area FS to the extreme left of color spectrum area 24 and white W to the extreme right. A second area represents a widely understood iconic representation of increasing intensity control area 26 (lying between $X_1$ and $X_2$ on the X-axis and between $Y_3$ and $Y_4$ on the Y-axis). The user slides their finger up and down to control intensity V. Intensity V increasing in an upward direction along the Y-axis. This organization allows a user to easily select a precise color and intensity. Color spectrum area 24 (primary colors shown as Yellow, Orange, Red, Violet, Blue, Cyan, Green, Yellow) allows a user to select a specific color within the aforementioned X/Y axis, whereas touching the touchpad up or down the Y-axis in color intensity control area 26 allows the user to set the selected color's intensity. It should be noted that placing the yellow to green and the yellow to orange spectrums near the bottom and top respectively allow a fast and simple user selection of warm colors. Warm colors are based on yellows, oranges, browns, yellowish greens, orangish reds and the like. Warm colors are often preferred by users when setting ambient lighting in residential environments. Software will sample the touchpad about 20 times/second to determine if it is in active use within the aforementioned areas. If in active use, the X-Y co-ordinates detected will determine the color selected and the color intensity. A software-implemented algorithm will then calculate the HSV/HSI color parametric values to be sent to a central light controller for processing. Separation of intensity from color selection, color spectrum area 24 and color intensity control area 26, allows intuitive mapping of intensity control for single colored light fixtures and enables intensity control for multiple lights simultaneously. Each light can be configured to output a different color. The separate color intensity control area 26 can then control the intensity of all light simultaneously without changing their color. Software can take the raw intensity information from touchpad assembly 2000 and convert it into absolute intensity values (all light fixtures have the same brightness) or relative intensity (the intensity level from the touchpad scales the light fixture's current intensity).

Figure 7:
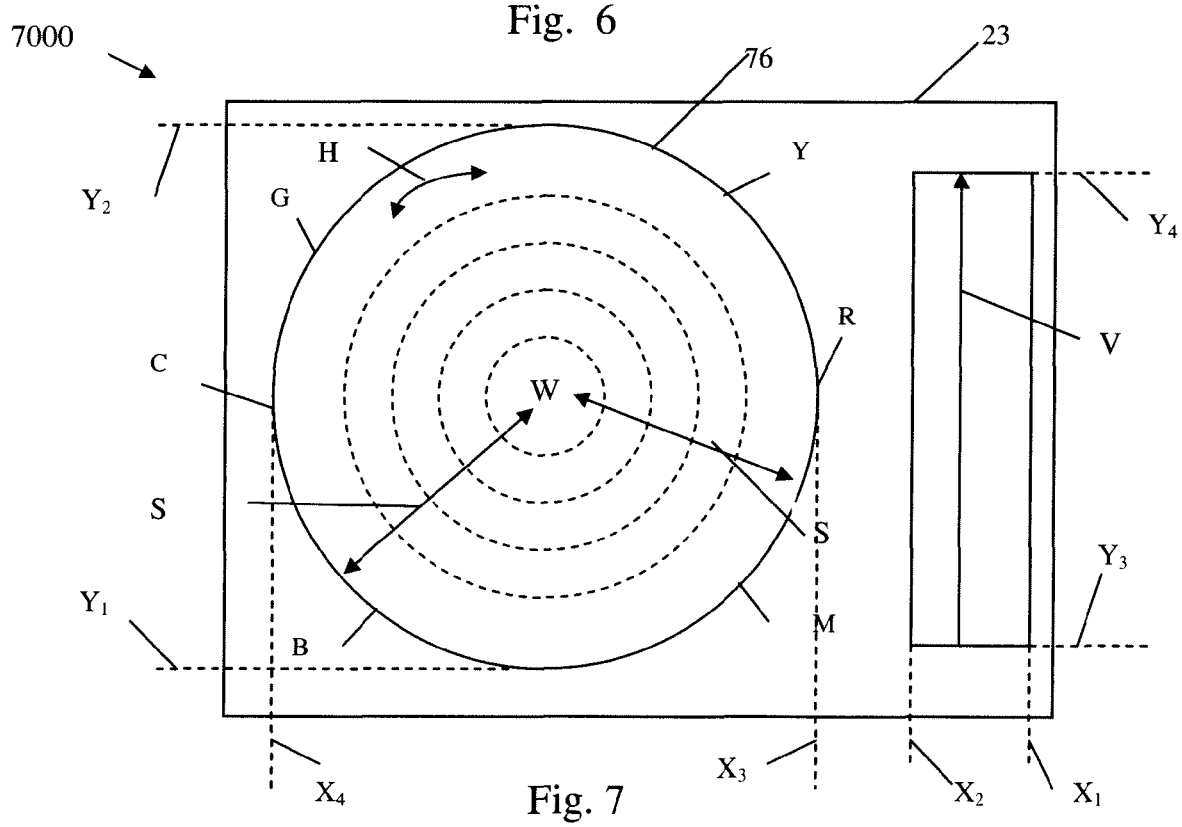
FIG. 7 is an alternate design layout showing a circular touch pad area for hue and saturation selection.

It should be noted that although a touchpad is used to describe the preferred embodiment of the present invention, other implementations are possible such as a touch screen or mouse to select color parameters including intensity. It should also be noted that other embodiments could employ various graphic geometries to represent a color spectrum, selection areas for color could be shapes such as a circle, etc. Commonly known in the art are other graphical representations of color that could be used; for example, CIE xyz color space, a basic color triangle, Newton's color circle (Ref. FIG. 7), and color wheel. Colors can be represented as saturated on the periphery and white at the center. Color spectrum/intensity graphic 20 is designed to intuitively guide a user through color control. Separation of the intensity from color selection allows two additional useful capabilities.

Intuitive mapping of intensity control for single colored light fixtures.

Enables intensity control for multiple lights simultaneously. Each light can be configured to output a different color. The separate intensity control area 26 can then control the intensity of all light simultaneously without changing their color. Software can take the raw intensity information from touchpad assembly 2000 and convert it into absolute intensity values (all light fixtures have the same brightness) or relative intensity (the intensity level from the touchpad scales the light fixture's current intensity).

Figure 2B:
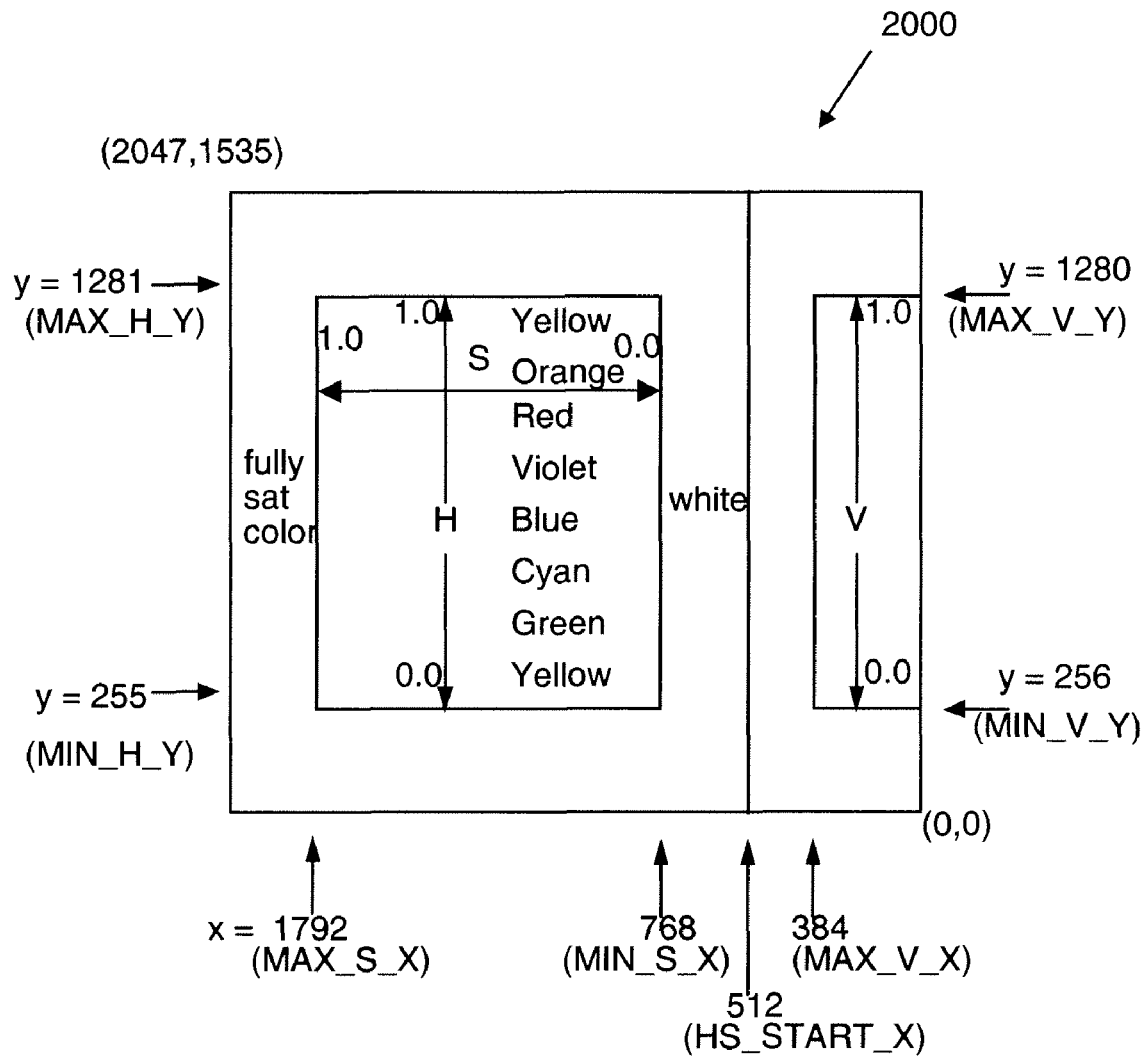
FIG. 2B is a specific example of touchpad areas used in the preferred embodiment of the present invention.

FIG. 2B is a specific example of touchpad areas described above in FIG. 2A and used in the preferred embodiment of the present invention. It is used to describe operation of the touchpad including generation of a packet to send and will be explained in more detail in the flow chart of FIG. 2C below. The process includes taking raw X, Y, and Z coordinate data from the touchpad and generating Hue, Saturation and Value (intensity) color data as well as a set of flags indicating which HSV components to use. The touchpad communicates using a PC-compatible mouse protocol called PS/2. Designed originally for Windows PCs, the protocol uses two wires (clock and data) to communicate between an input device and computer. Both wires are used in a bi-directional fashion depending on the direction of communication. The computer communicates with the input device to configure or change its operation. Normally the input device drives both clock and data to transmit coordinate information to the computer. It transmits a constant stream of data to the PC who interprets the data. In most PC applications the input device transmits a short packet indicating the amount the input device has moved since the last transmission (delta values). This application has the touchpad configured to transmit a longer packet that contains the absolute X and Y position and the "strength" of the contact between a finger and the touchpad (Z). The preferred embodiment typically uses Cirque® TSM9957 (or similar) touchpad which can respond with X values between 0 and 2047, Y values between 0 and 1536 and Z (pressure) values between 0 and 255. The (0,0) coordinate for the touchpad is in the lower right-hand corner as shown in FIG. 2B.

Regions on the touchpad are shown below with their coordinate values. For mathematical purposes the values of H, S and V are considered to have a range of 0.0 to 1.0 (fully off to fully on). Integer values are scaled to be integer representations of this range.

It is possible to conceive of other organizations of color control data on control surfaces. It is also possible to conceive that the graphic would be drawn on a computer-generated display and the selection would be made through a mouse, stylus or touch screen input device in lieu of a touchpad.

Figure 2C:
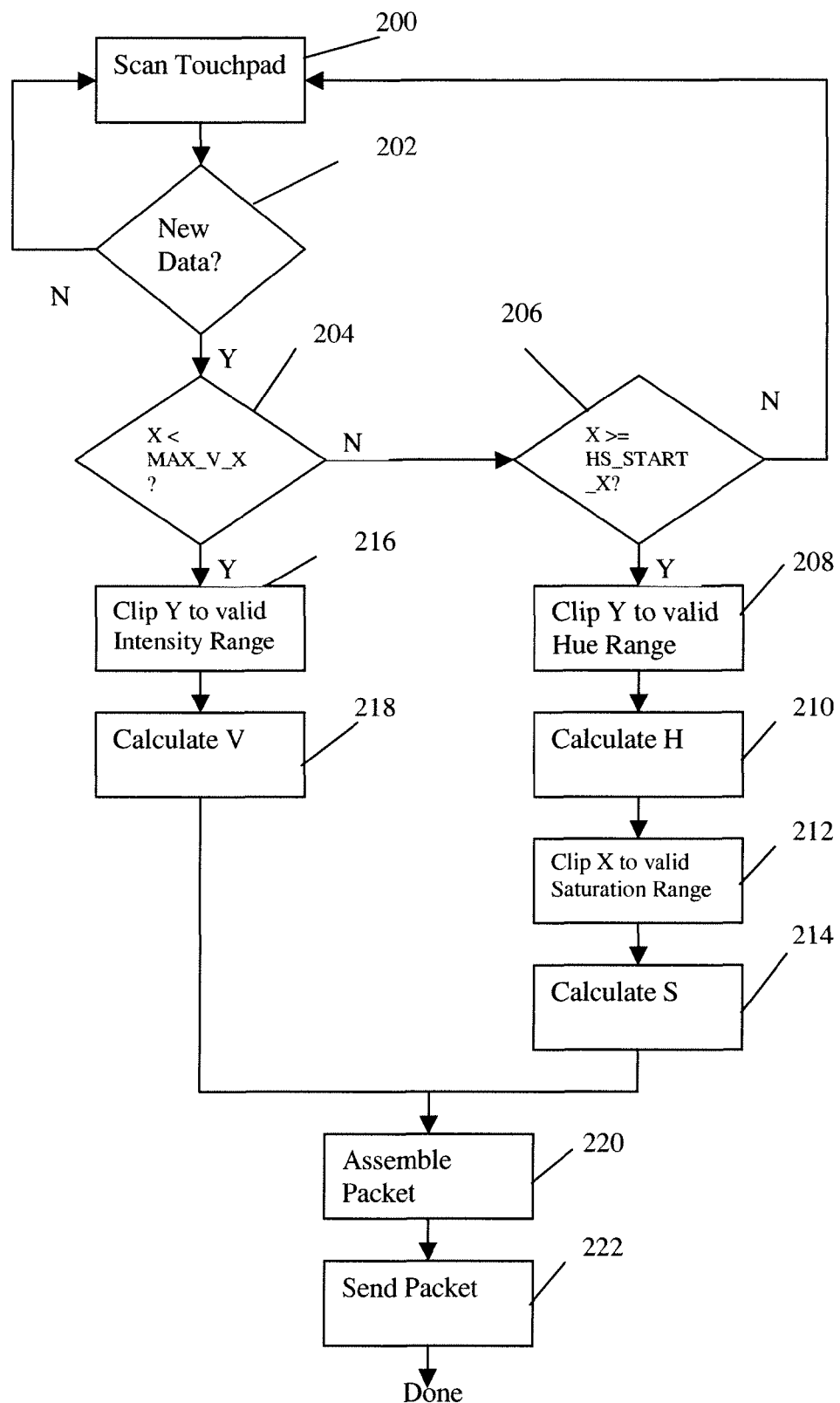
FIG. 2C is a flowchart of touchpad packet generation from touchpad area monitoring.

Note that the active regions are set at a significant distance from the edge of the touchpad. This is because the touchpad is a very imprecise device. The value it reports depends heavily on the physical shape and electrical characteristics of the particular finger touching its surface. Placing the active regions too close to the edge of the touchpad could result in difficulty reading finger positions for certain users. Twenty times per second (every 50 mSec) the software checks the touchpad and decides if it can generate a packet to transmit. This value is chosen to allow smooth color changes as a finger is dragged across the touchpad. The basic algorithm is shown in FIG. 2C.

Layouts of color, intensity are shown by way of example and not of limitation. Other examples are shown in FIGS. 2H, 2I, 2J.

Figure 2D:
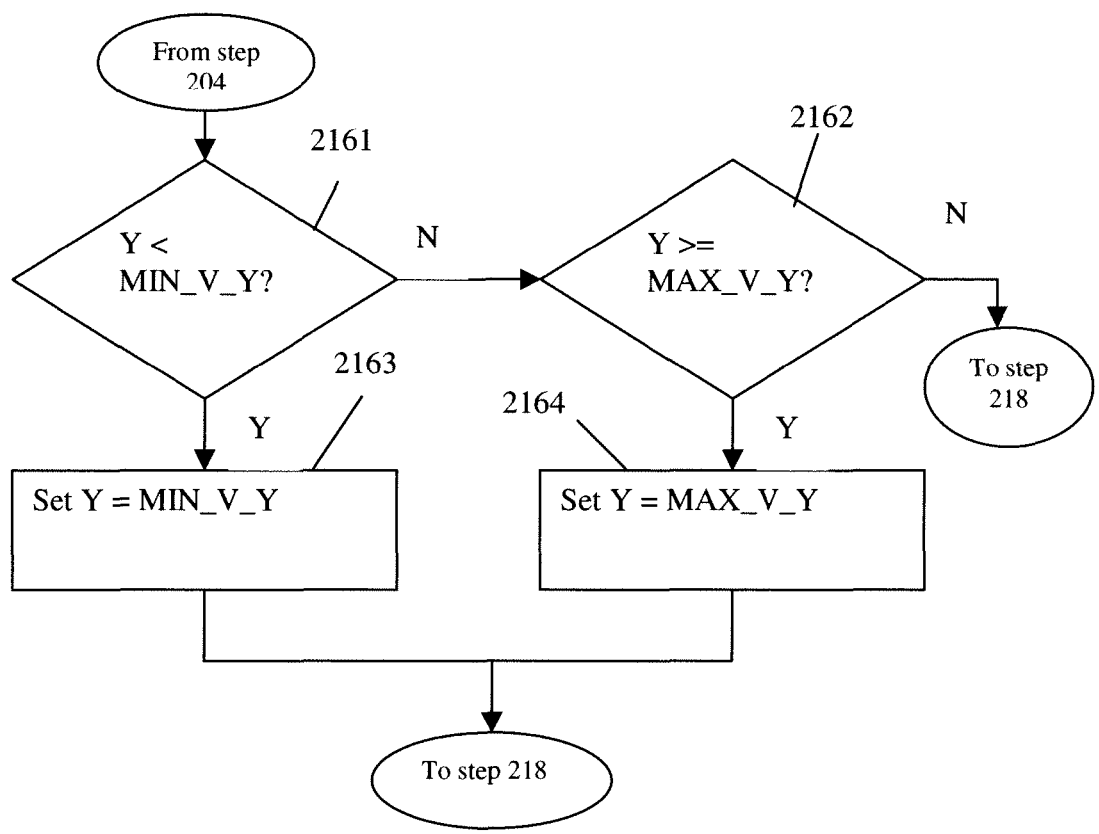
FIG. 2D is a flowchart of the clip Y to a valid Intensity range.
Figure 2E:
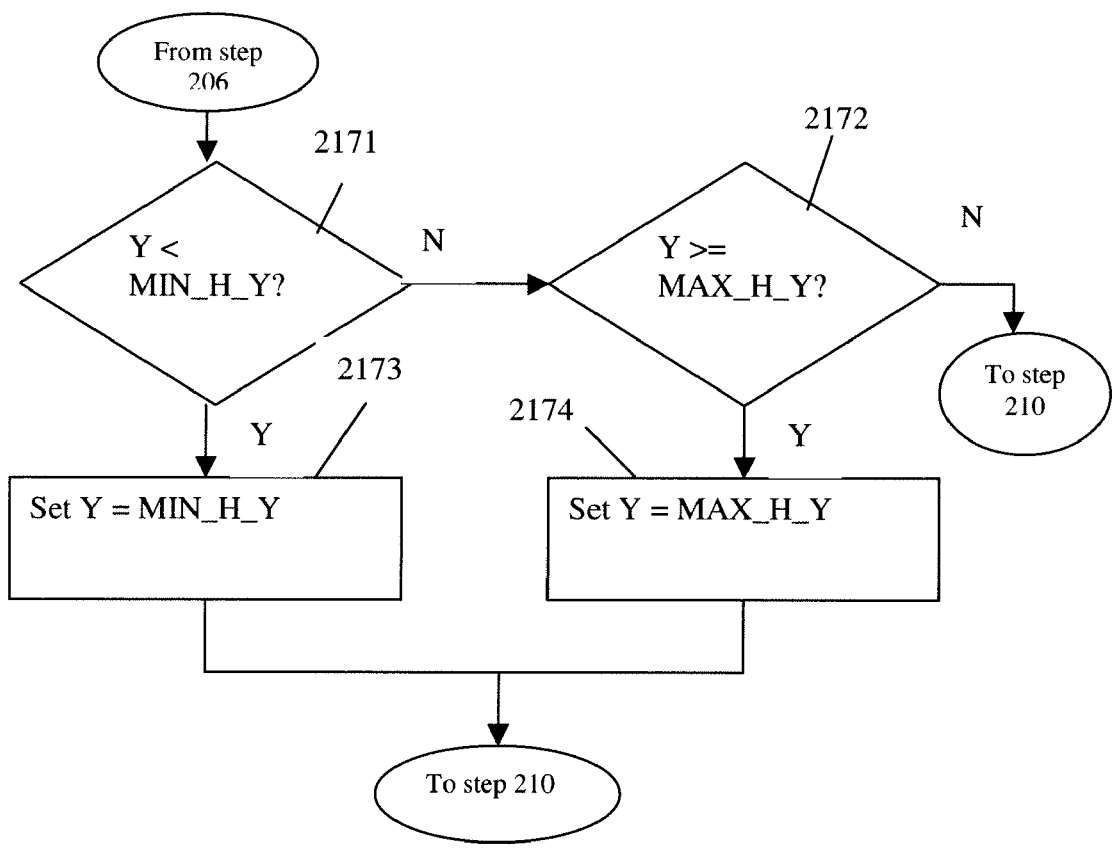
FIG. 2E is a flowchart of the clip Y to a valid Hue range.
Figure 2F:
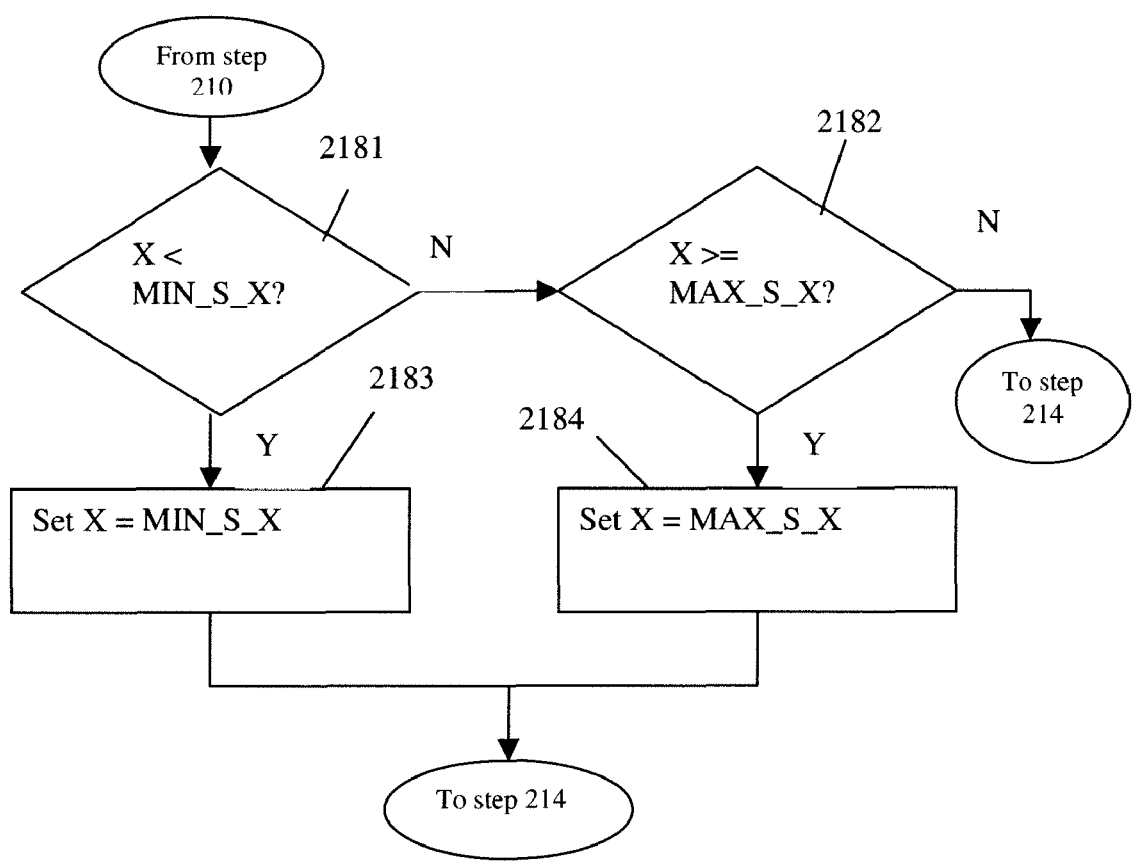
FIG. 2F is a flowchart of the clip X to a valid Saturation range.
Figure 2G:
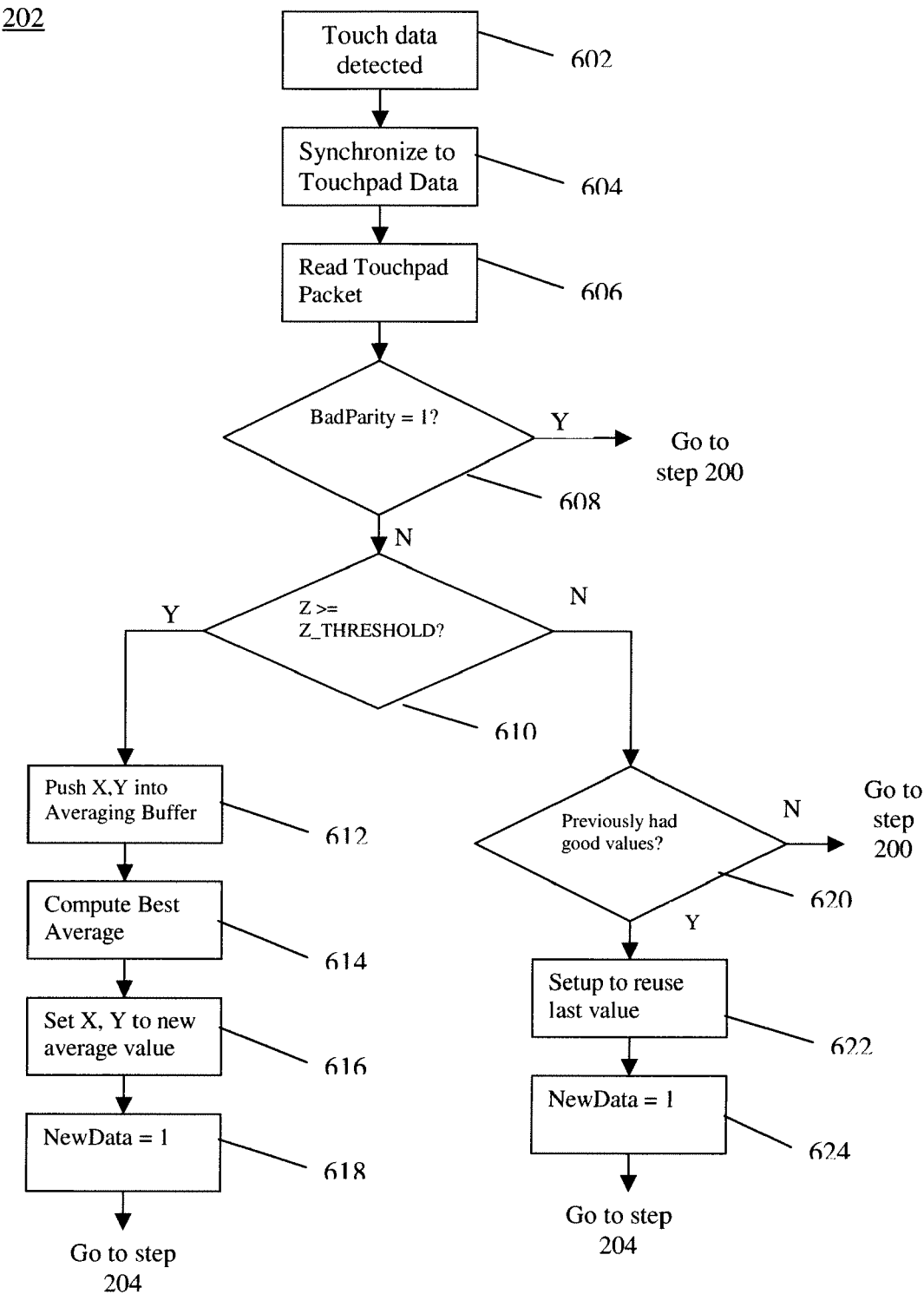
FIG. 2G is a flowchart of Y touchpad parity and data validation.
Figure 2H:
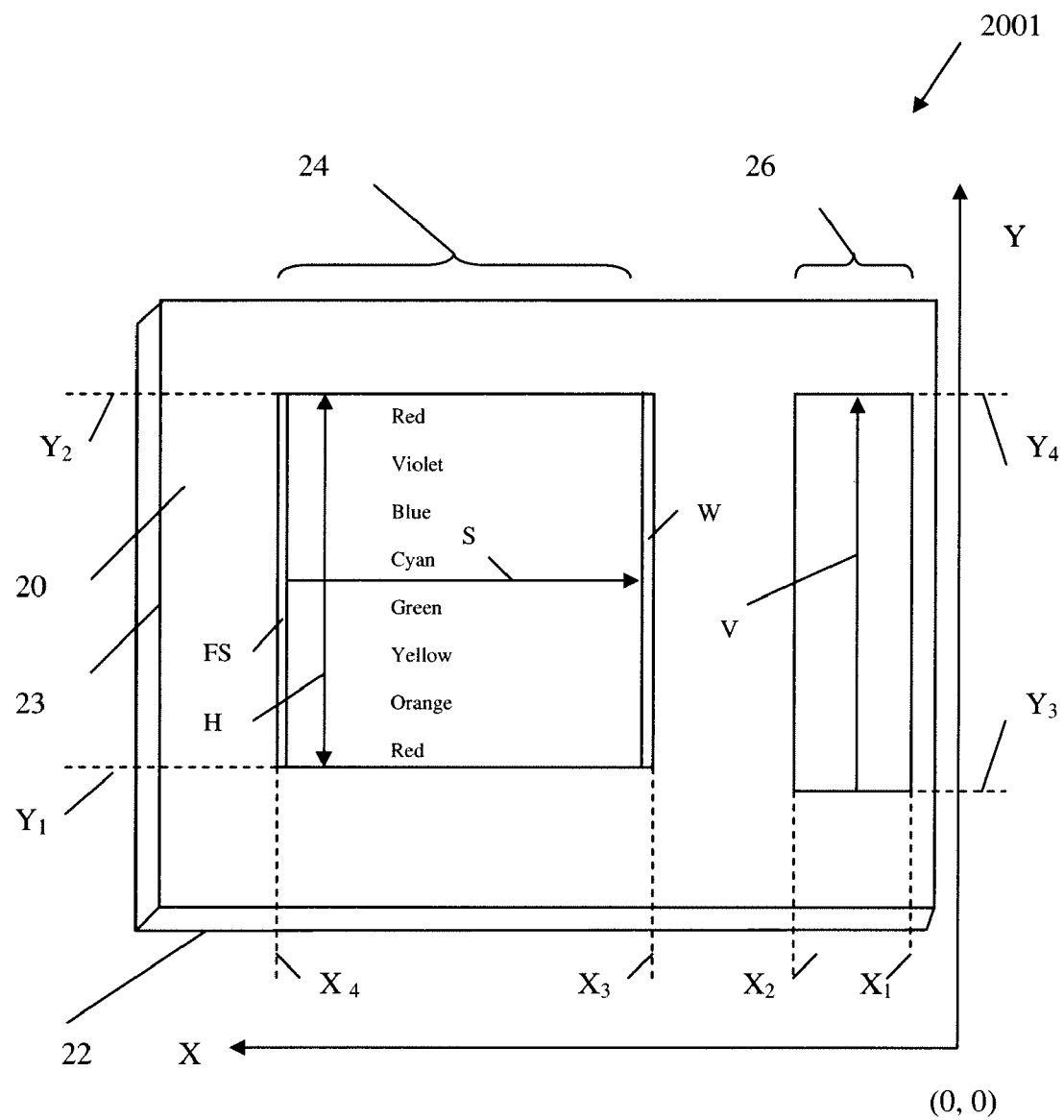
FIGS. 2H, 2I show a touch pad assembly with the color spectrum or Hue in a different arrangement.
Figure 2I:
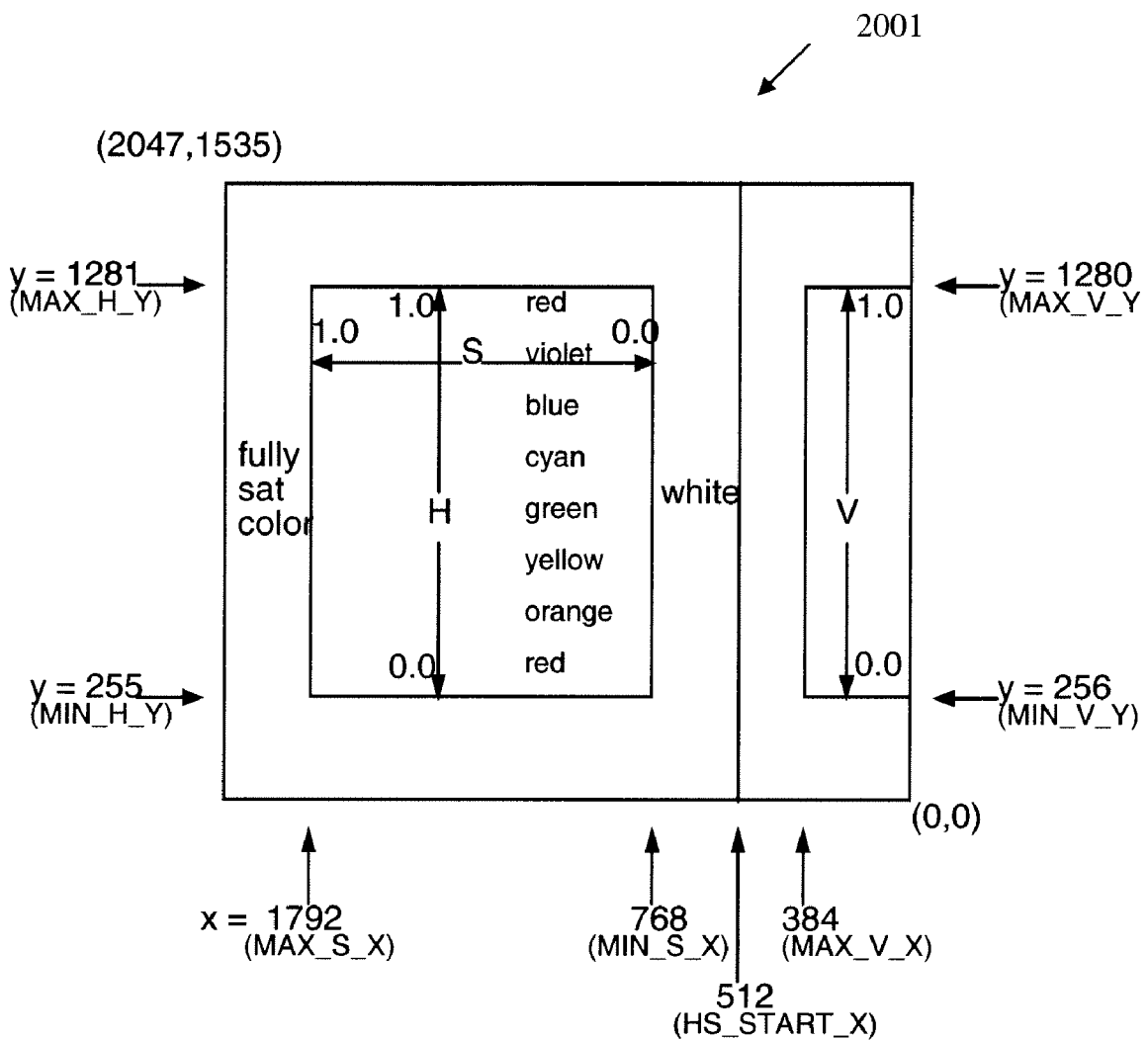

FIGS. 2H, 2I showing touchpad assembly 2001 are similar to FIGS. 2A, 2B with the exception that the color spectrum or Hue H is presented in a different arrangement going from Red, Violet, Blue, Cyan, Green, Yellow, Orange and Red when going from $Y_2$ to $Y_1$.

Figure 2J:
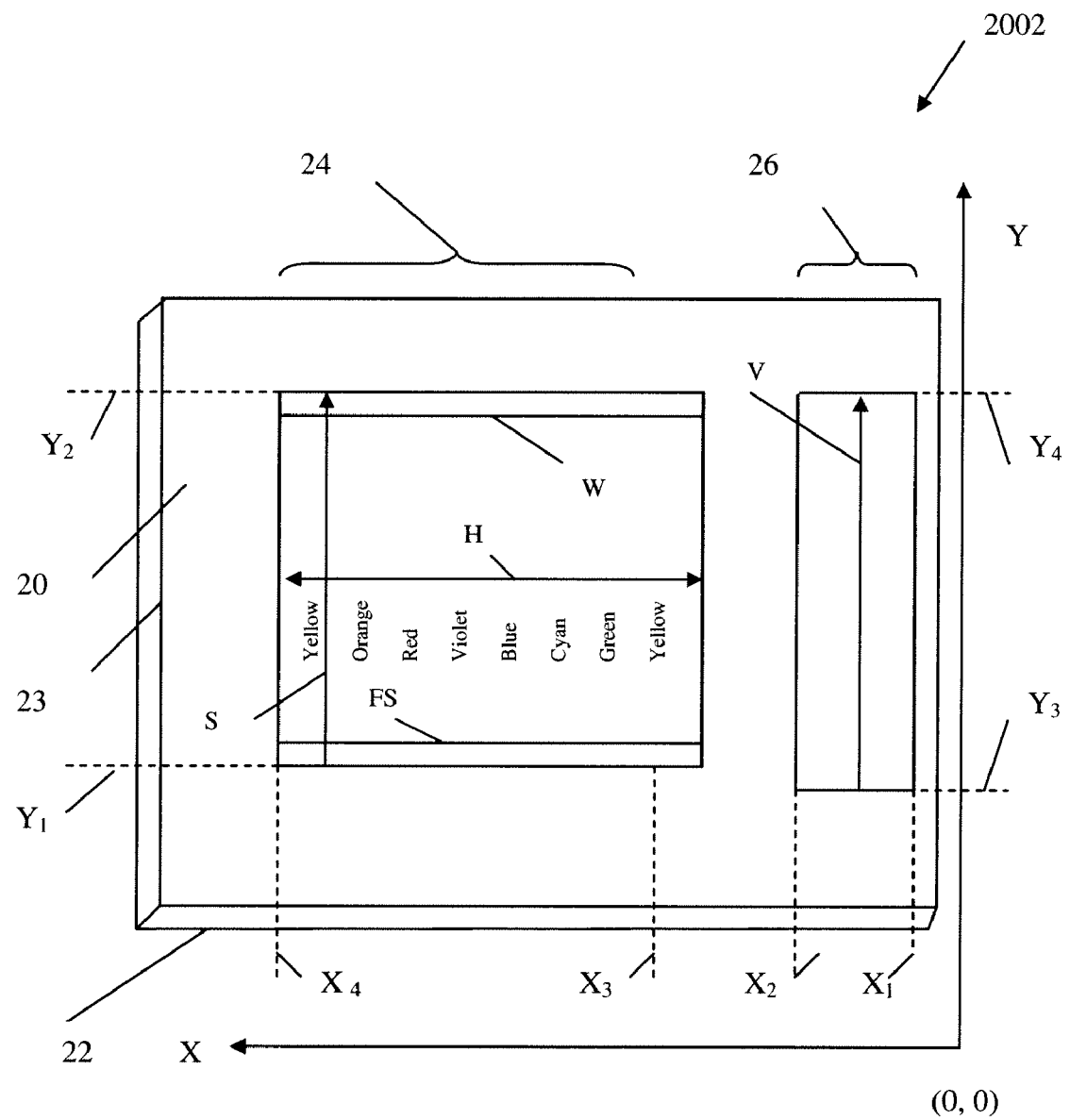
FIG. 2J is an alternate touch pad assembly layout with the Hue H selection on the horizontal is and Saturation along the Vertical axis.

FIG. 2J is but another touchpad assembly 2002 layout with the Hue H selection on the horizontal or X-axis and Saturation along the Vertical or Y-axis.

Intensity has been shown along the Y-axis but could easily be configured along the X-axis.

FIG. 2C is a flowchart of touchpad packet generation from touchpad area monitoring as shown in FIG. 2B. The "Scan Touchpad" code is responsible for getting data from the touchpad, verifying that the data is valid, loading the data into an averaging buffer and computing a current average X and Y location. Referring to FIG. 2C a continuous scan of the touchpad is done every 50 milliseconds, step 200. In step 202, if no data is detected it returns to step 200 and continues to monitor for new data. Data validation checking is performed as a part of step 202 before proceeding to step 204. Step 202 is expanded in FIG. 2G below. If new data is detected it proceeds to step 204. Refer to FIG. 2B for all example values. If X is not less than MAX_V_X (or 384) then proceed to step 206. In step 206, test for X greater or equal to HS_START_X (or 512). If the test result is 'no', then return to step 200. If the test result is 'yes' then proceed to step 208 to clip Y to a valid Hue range (255 to 1281). Refer to FIG. 2E below for Hue clipping flow chart. Then in step 210 the H (Hue) value is calculated.

To expand step 210, the "Calculate H" code first calculates a raw H value (Hraw) with an integer value of 0-1025. This range is chosen to make subsequent calculations easier because it may be split into 6 identical subranges (171 each). The code then calculates the H value in two parts. A 3-bit range (Hr) that has a value of 0-5, and an 8-bit fractional value (Hf, within the range) of 0-255. The following calculations are used:

```
Hraw = Y − MIN_H_Y
if Hraw < 171
    Hr = 1
    Hf = HSV_f_TABLE(Hraw)
else if Hraw < 342
    Hr = 2
    Hf = HSV_f_TABLE(Hraw − 171)
else if Hraw < 513
    Hr = 3
    Hf = HSV_f_TABLE(Hraw − 342)
else if Hraw < 684
    Hr = 4
    Hf = HSV_f_TABLE(Hraw − 513)
else if Hraw < 855
    Hr = 5
    Hf = HSV_f_TABLE(Hraw − 684)
else
    Hr = 0
    Hf = HSV_f_TABLE(Hraw − 855)
```

The HSV_f_TABLE is used to provide a fast divide function (since division requires a significant amount of time on a low-end 8-bit microcontroller). The table is indexed by a value between 0 and 170 and returns a scaled fractional value of 0-255. Each entry is computed from the equation:

$$\text{Entry}[I] = \text{round}(255.0/170.0 * I) \text{ where } I=0 \text{ to } 170$$

Thus a HSV_f_TABLE is precalculated for all 0-170 entry possibilities via the above equation. The table is then used to obtain a value from 0-255 to speed up processing.

Next, in step 212, 'X' is clipped to a valid Saturation range. The "Clip X to valid Saturation Range" code works in a similar fashion to the "Clip Y to valid Intensity Range" code and is described below in FIG. 2F. It returns a value of X such that MIN_S_X<=X<=MAX_S_X so that finger touches to the right of the HS square return the minimum S value and finger touches to the left of the HS square return the maximum S value. Thus, referring to FIG. 2B, 768<=X<=1792.

Next, in step 214, Saturation is calculated. The "Calculate S" code works like the "Calculate V" code. It calculates a value of S with an integer value of 0-256 (0-0x0100 in hexadecimal) representing the numeric value 0-1.0. It does this with the following equation:

$$S = \text{round}((X − \text{MIN\_S\_X})/4)$$

Where the round function takes the remainder from the division and rounds the result up if the remainder is greater than the integer equivalent to 0.5. After 'S' is calculated, proceed to step 20 to assemble the packet.

If in step 204, X is less than MAX_V_X (value 384 per example of FIG. 2B) proceed to step 216 to clip 'Y' to a valid Intensity range (Refer to FIG. 2D). Next, in step 218 a 'V' value is calculated. The "Calculate V" code calculates a value of V with an integer value of 0-256 (0-0x0100 in hexadecimal) representing the numeric value 0-1.0. It does this with the following equation:

$$V = \text{round}((Y − \text{MIN\_V\_Y})/4)$$

Where the round function takes the remainder from the division and rounds the result up if the remainder is greater than the integer equivalent to 0.5. In the example of FIG. 2B, the value of MIN_V_Y is 256.

There are two checks that touchpad software performs to make sure the data is valid. The first is to make sure that there are no parity errors in any data obtained from the touchpad. The second is to make sure that the "touch" of the finger on the touchpad is sufficient to consider intentional. The averaging buffer is used to remove jitter from the data. Due to the way it is implemented, the touchpad will commonly return differing X and Y values for a stationary finger. The algorithm to obtain data from the touchpad is shown below in FIG. 2G.

FIG. 2D is a flowchart of the clip Y to a valid Intensity range, expansion of step 216 of FIG. 2C. In step 2161, Y is checked to see if Y is less than MIN_V_Y (256 per FIG. 2B), If less then, in step 2163, Y is set to MIN_V_Y prior to moving to step 218 (FIG. 2C). If Y is not less than MIN_V_Y then Y is checked, in step 2162, to see if it is greater than MAX_V_Y (1280 in our example of FIG. 2B), if yes then in step 2164 Y is set to MAX_V_Y (1280) prior to moving to step 218 (FIG. 2C). If no, then the process proceeds to step 218.

FIG. 2E is a flowchart of the clip Y to a valid Hue range, expansion of step 208 of FIG. 2C. In step 2171, Y is checked to see if Y is less than MIN_H_Y (255 per FIG. 2B). *If* less then, in step 2173, Y is set to MIN_H_Y (255 in our example) prior to moving to step 210 (FIG. 2C). If Y is not less than MIN_H_Y then Y is checked, in step 2172, to see if it is greater than MAX_H_Y (1281 in our example of FIG. 2B), if yes then, in step 2174, Y is set to MAX_H_Y (1281) prior to moving to step 210 (FIG. 2C). If no, then the process proceeds to step 210.

FIG. 2F is a flowchart of the clip X to a valid Saturation range, expansion of step 212 of FIG. 2C. In step 2181, X is checked to see if X is less than MIN_S_X (768 per FIG. 2B), if less then, in step 2183, X is set to MIN_S_X (768 in our example) prior to moving to step 214 (FIG. 2C). If X is not less than MIN_S_X then X is checked, in step 2182, to see if it is greater than MAX_S_X (1792 in our example of FIG. 2B), if yes then, in step 2184, X is set to MAX_S_X (1792) prior to moving to step 214 (FIG. 2C). If no, then the process proceeds to step 214.

FIG. 2G is a flowchart of touchpad parity and data validation. The touchpad is continuously transmitting 5-byte packets containing raw X, Y and Z information while the software is allowing the user to use the touchpad to change light colors. The software first waits for any currently in-progress byte to be transmitted, step 602. The "Synchronize to touchpad Data" code, step 604, synchronizes the software back to the data stream. This is necessary because the software may execute this code at any time relative to transmission of a touchpad packet. It does this by waiting for a period between bytes. The software then waits for the final byte in any current packet to be transmitted. The final byte is demarcated with a specific bit set.

The "Read Touchpad Packet" code, step 606, reads 5 bytes from the touchpad and stores them in a buffer. It checks the parity on each byte to make sure the byte was correctly received, step 608. After 5 valid bytes have been received it assembles the X, Y and Z values from the packet data (each value is stored within multiple bytes in the packet). If any byte had bad parity, step 608, the 'BadParity' flag is set and code returns to continue new data monitoring (step 200 FIG. 2C).

Once a packet has been converted to valid X, Y and Z values the 'Z' value is checked to make sure it exceeds a threshold, step 610. This threshold indicates that a finger is in sufficient contact with the touchpad to generate valid data. A special case is detected for the situation where a finger is just leaving touching the touchpad. This allows the software to send a final duplicate packet if necessary to help improve reliability of wireless interfaces.

If, in step 610, Z is greater than or equal to Z-threshold then, in step 612, valid X and Y values are pushed into a 4-entry averaging buffer. Averages are calculated, step 614. The software generates an averaged X and Y value by averaging as many entries as are currently in the buffer, then sets X,Y to a new average value, step 614. This allows the software to start generating color packets as soon as the touchpad is touched but then quickly remove jitter from the input. For example if the averaging buffer is empty (it is cleared when the finger is removed from the touchpad) the first X and Y value is just the value pushed into the averaging buffer. The next time through the loop a second set of raw X and Y values are pushed into the averaging buffer and the X and Y value to be used are an average of the first and second set. The software only generates averages of even numbers of entries so the third pass through the loop generates an average of the second and third sets of raw data and the fourth and subsequent passes through the loop generate an average of the current raw data and previous three buffer entries. Once X,Y are set to a new average value, a 'new data' bit is set in step 618 and the code proceeds to step 204 (FIG. 2C).

If, in step 610, Z were less than Z-threshold, the code would proceed to step 620 and check to see if there were previously good data values. If not, then code would proceed back to step 200 (FIG. 2C) to continue scanning the touchpad. If there were previously good data values, the code would proceed to step 622 and set to reuse the last good values, then set the 'new data' bit to 1 and go to step 204 (FIG. 2C).

Figure 1:
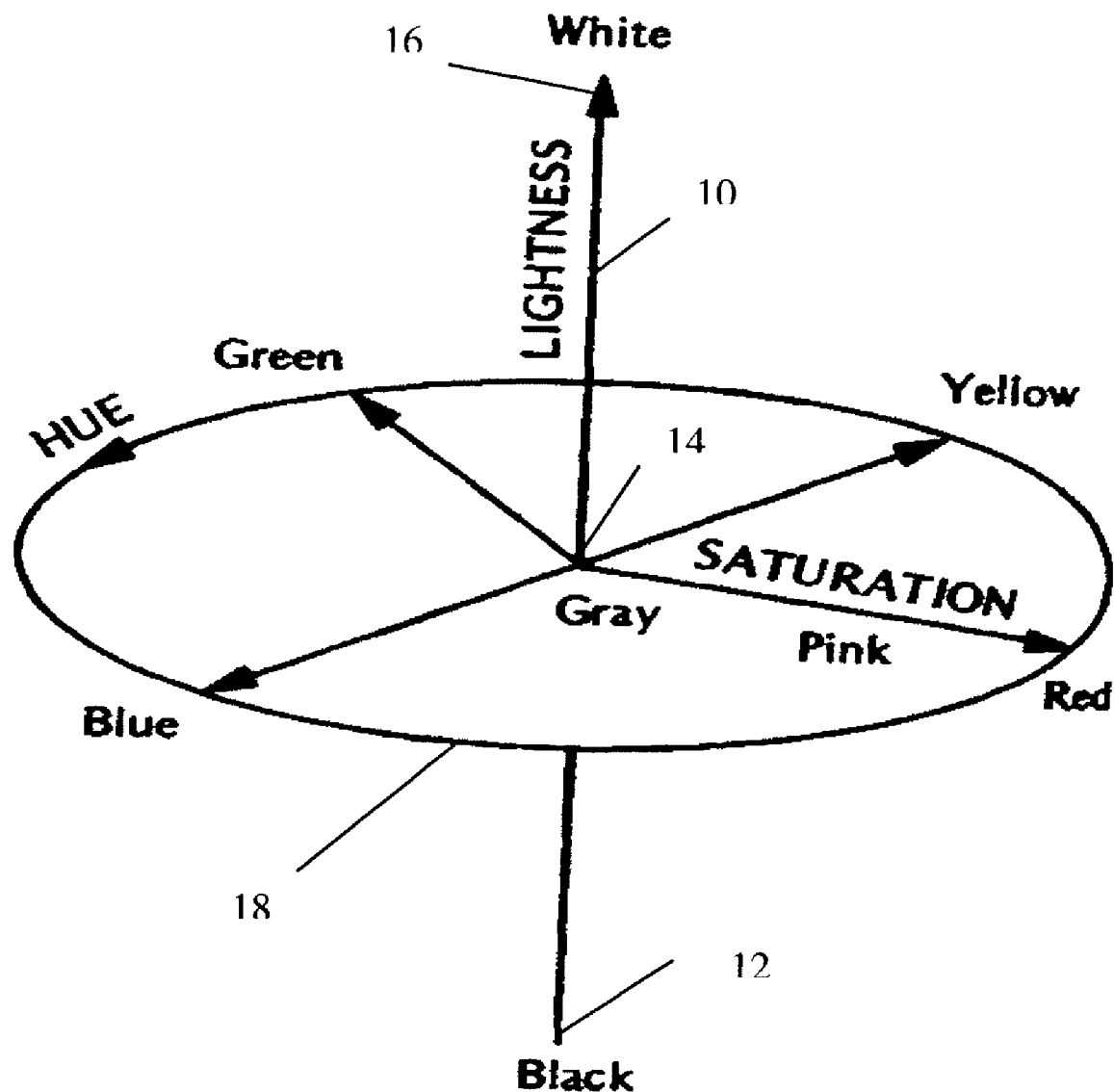
FIG. 1 (prior art) is a three-dimensional color space showing Hue, Saturation and Lightness (Intensity).

The aforementioned preferred embodiment is shown by way of example and not of limitation. It is possible to conceive of other organizations of color control data on various geometric control surfaces. It is also possible to conceive that the graphic would be drawn on a computer-generated display and the color selection would be made through a mouse, stylus or touch sensitive screen. As another example, a variant on the two-region design described in FIGS. 2A, 2B could an intensity region that could be either vertical (as described) or horizontal in orientation. The color selection area to be a circle with the colors arranged in a rainbow around the periphery and a white center (like the top-most slice in FIG. 1 color space diagram). The color could be selected about the periphery and then de-saturated by dragging one's finger in toward the middle.

Figure 3A:
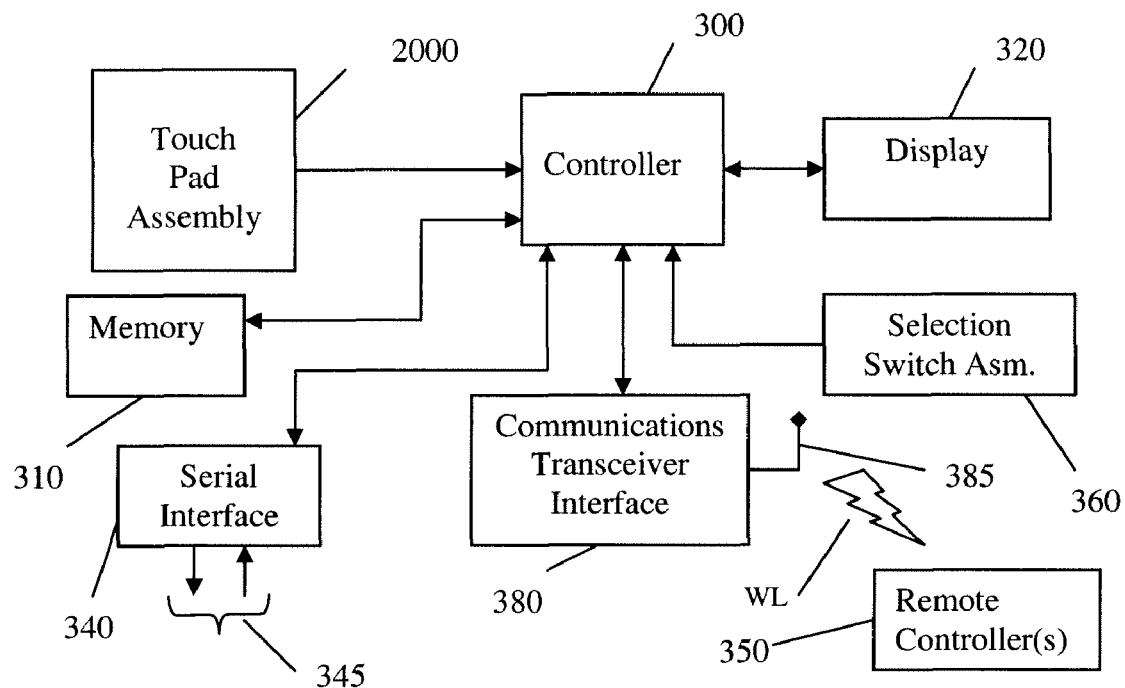
FIG. 3A is a simple schematic diagram of the touchpad assembly integrated into a multi-light controller handheld remote control unit.

FIG. 3A is a schematic diagram of touchpad assembly 2000 integrated into a multi light controller handheld remote control unit. The schematic is shown by way of example and not of limitation. Other circuit schematics can accomplish the same result. Touchpad assembly 2000 uses industrial standard Serial and PS/2® communication protocols to communicate with light controller 300. Light controller 300 can be a micro-controller (preferred embodiment), an ASIC (application specific integrated circuit), a general purpose computer, or a custom logic circuit. Display unit 320 would show the control mode (i.e. manual control, program control, scene control etc.) as selected via selection switch assembly 360. Selection switch assembly 360 would also allow selection of light zones(s), group(s), and individual light units. Memory 310 is for data storage/program storage. Serial interface 340 allows light controller 300 two-way communication for downloading loading such items as pre-loaded, configured scenes, software downloading, uploading captured manual settings, etc. via input/output serial link 345. Selection switch assembly 360 also allows user selection of specific zones(s), group(s), and individual unit lights. Communication interface 380 would send information to remote light controller(s) 350 via antenna 385 using wireless link WL containing packet data having commands, addresses, HSV/HSI, fade time, checksum, and special flag bits. Communication interface 380 would also allow main light controller 300 to query information from remote light controller(s) 350 such as color set etc.

Figure 3B:
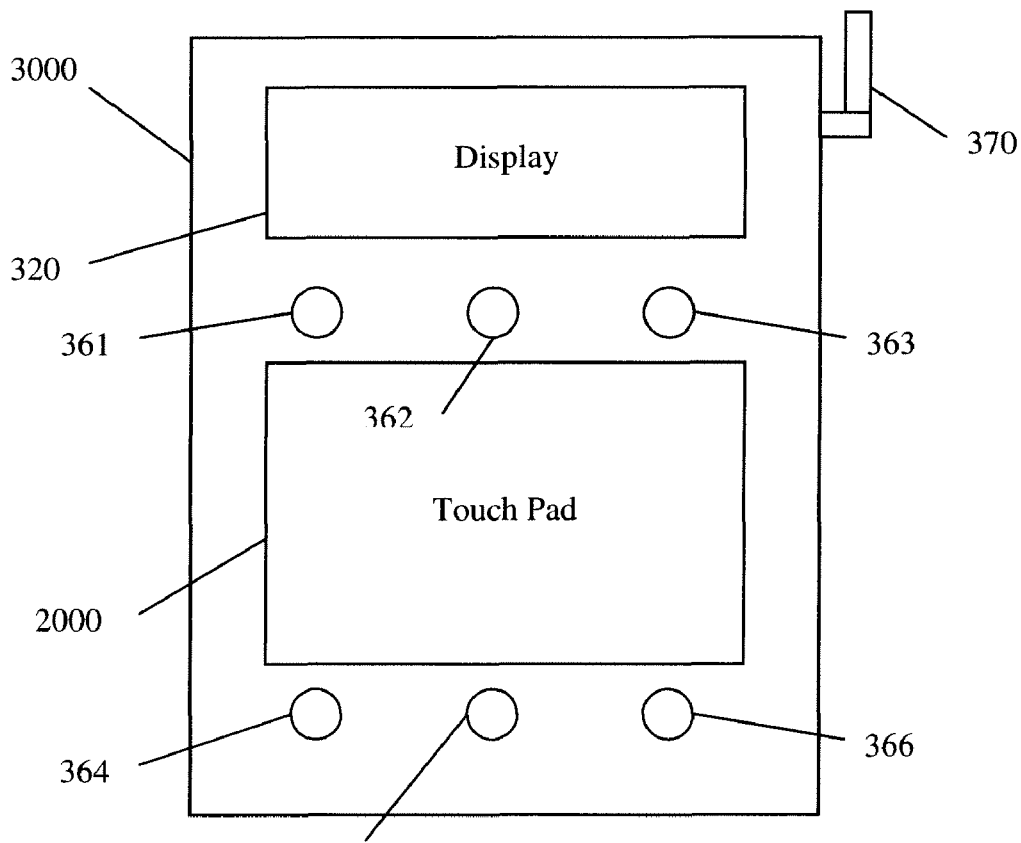
FIG. 3B is a plane front view of a handheld remote control unit.

FIG. 3B is a plane front view of a handheld remote control unit 3000. Handheld remote control unit 3000 is shown by way of example and not of limitation. Other remote units could be implemented via general purpose computers, PDAs (i.e. Blackberry®, Apple iPhone®, etc.). Display 320 can be an LCD or other type display. It will show information based on switch selections to allow a user to enter a mode and scheme selection. Switch functions, for example, can be as follows:

Manual Control mode, switch 364;
Program Control mode, switch 365;
Scene Control mode, switch 366;
Zone, program or scene selection, switch 361;
Group selection within a zone, switch 362;
Unit (individual light) selection within a zone, switch 363.

Touchpad assembly 2000 is used to select the color and intensity as previously described corresponding to the switch selections. Communication is done via communications antenna 370.

Figure 3C:
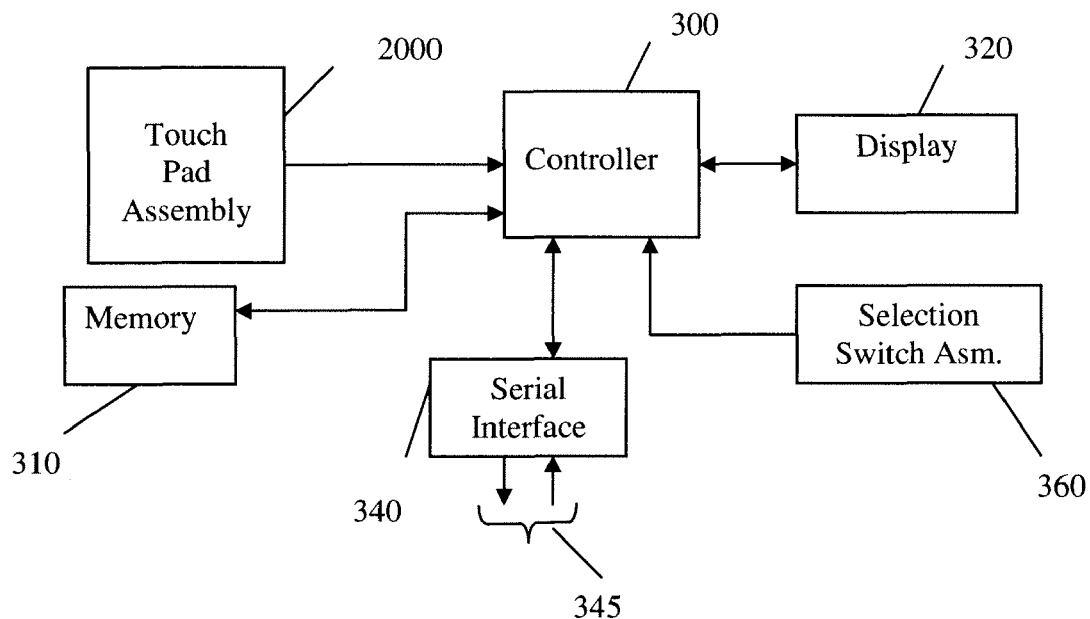
FIG. 3C is a simple schematic diagram of the touchpad assembly integrated hard wired multi-light controller.

FIG. 3C is a simple schematic diagram of the touchpad assembly integrated hard wired multi-light controller. Functions of touchpad assembly 2000, light controller 300, display unit 320, selection switch assembly 360 are the same as previously described. Serial interface 340 is used to communicate with remote light controllers and also allows light controller 300 two-way communication for downloading loading such items as pre-loaded, configured scenes, software downloading, uploading captured manual settings, etc. via input/output serial link 345.

Figure 3D:
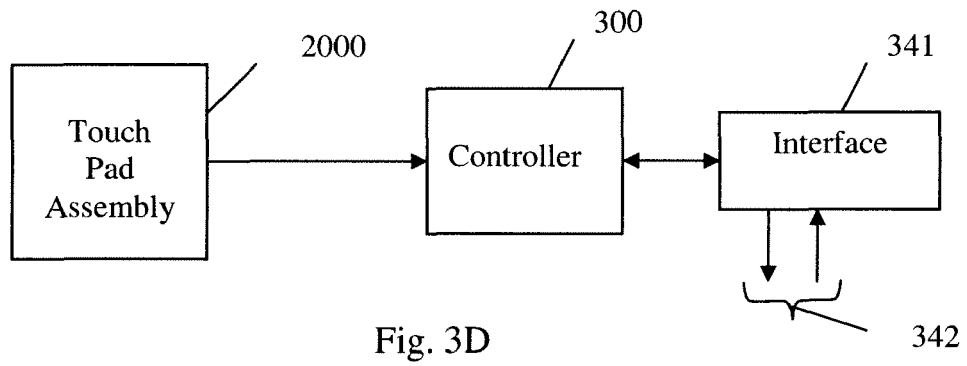
FIG. 3D is a simple schematic diagram for a light controller having a single color-capable light to control.

FIG. 3D is a simple schematic diagram for a light controller having a single color-capable light to control. It consists of touchpad assembly 2000, light controller 300 as previously described and an interface 341 having input/output link 342 which would use a 'dj2' protocol, which is the packet protocol of the present invention.

Figure 3E:
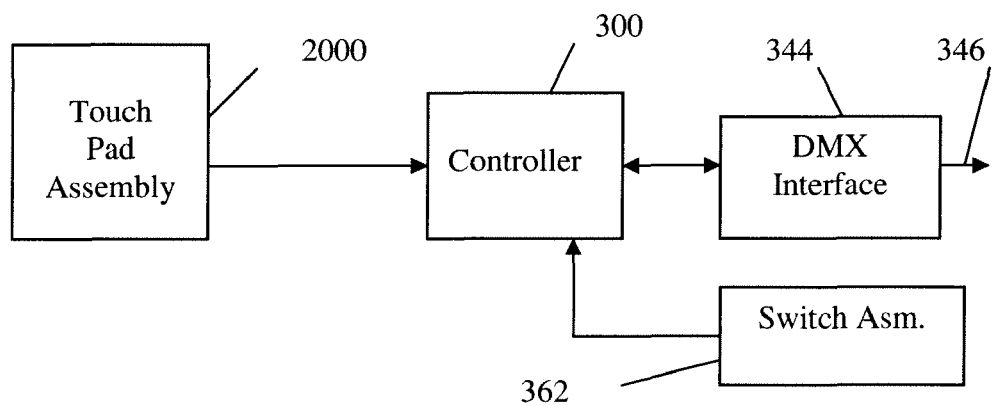
FIG. 3E is a simple schematic diagram for a light controller having a single color-capable light to control using DMX protocol for controlling a DMX fixture.

FIG. 3E is a simple schematic diagram for a light controller having a single color-capable light to control using DMX protocol for controlling a DMX fixture. It consists of touchpad assembly 2000, light controller 300 as previously described and an DMX interface 344 having DMX output 346 which would directly feed and control a DMX light fixture. Switch assembly 362 is used to configure the light controller for the specific DMX device it controls.

Although not shown, PC-based light controllers could be employed. For example, a PC-based light controller could export a web-accessible interface to control lights remotely or from intelligent devices such PDAs or smart phones (i.e. Apple iPhone®).

Although not shown, the industry standard 0-10 volt signal control can be supported via a Digital to Analog converter by changing the x-bit intensity value to a voltage range of 0-10 volts for intensity control.

Figure 4:
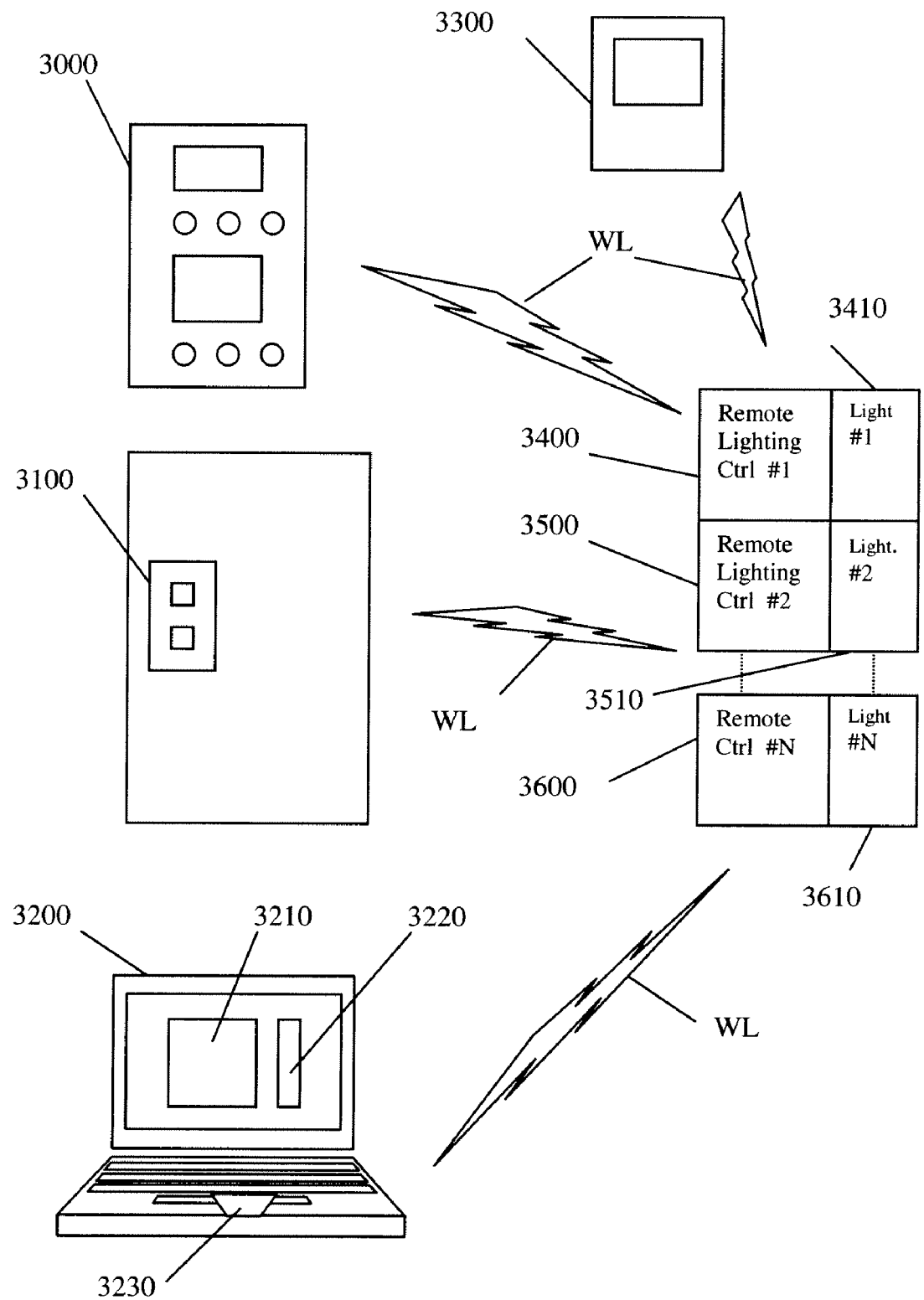
FIG. 4 is a depiction of various color control and intensity selection embodiments using touchpad sensors, personal computers or PDAs.

FIG. 4 is a depiction of various color control and intensity selection embodiments using touchpad sensors, personal computers or PDAs. Touchpad color selection and intensity selection can be integrated into a number of central control devices not limited to the following:

A handheld remote control unit 3000 (ref. FIG. 3A);
A wall mounted control unit 3100 similar in function to handheld remote control unit 3000;
Various type of PDAs and smart phones 3300 (i.e. Blackberry®, Apple iPhone®, etc.);
A general purpose or laptop computer 3200.

All of the methods would communicate to remote color light controllers via a wireless links WL or a hard wired connection (not shown). Remote lighting control units 3400, 3500, 3600 would control respective lights #1 3410, #2 3510, through group #N 3610 within a zone. Wireless link WL would contain packet data having commands, addresses, HSV/HSI, fade time, checksum, and special flag bits. The communication interface would also allow the main light controller to query information from each of the remote lighting controllers 3400, 3500, 3600 such as color set etc. A plurality of zones (only one shown) and groups within zones are controlled by an individual central control unit.

Figure 5A:
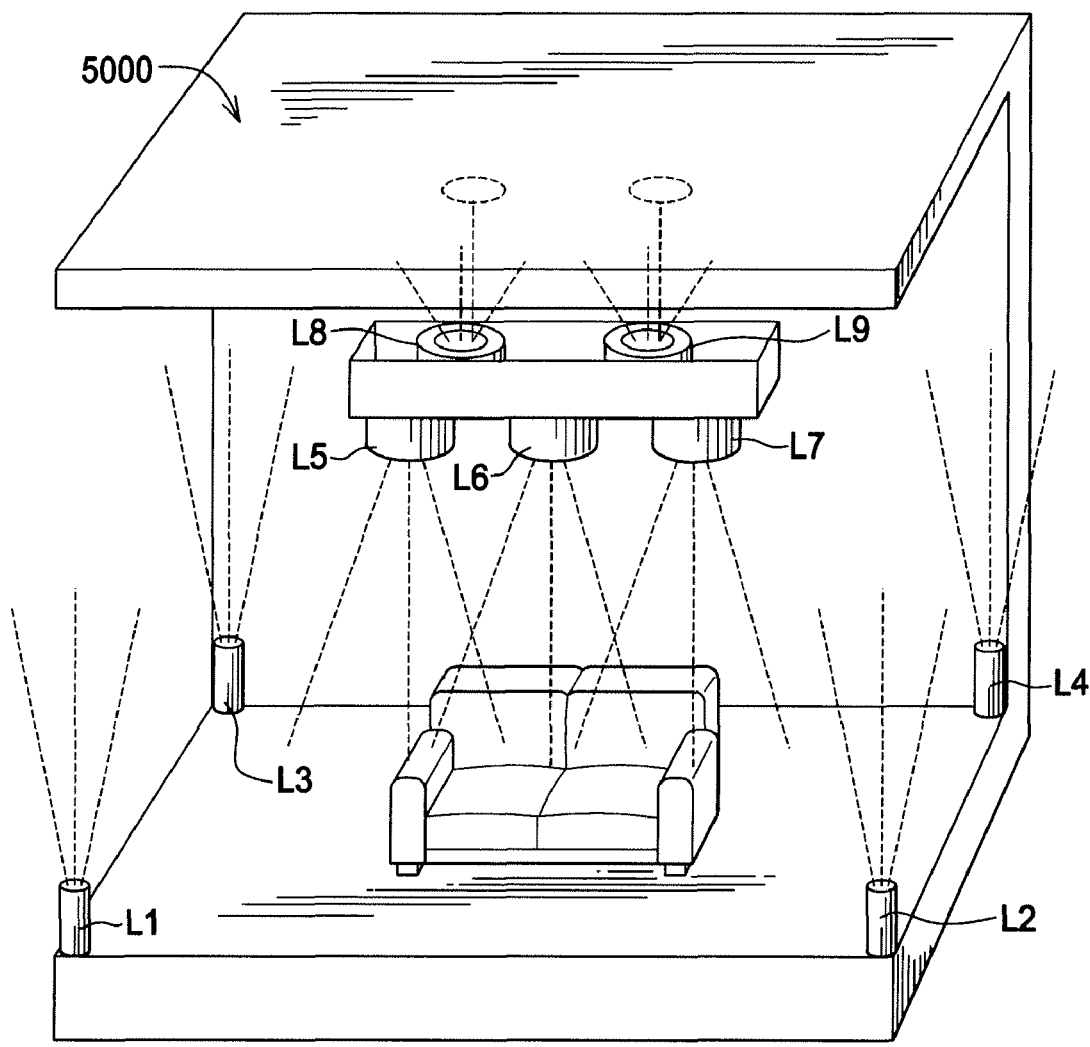
FIG. 5A is a front perspective view of an example installation containing a plurality of lighting groups with individual unit lights.

FIG. 5A is a front perspective view of an example installation 5000 containing a plurality of lighting zones; one with groups; and all with individual unit lights. Shown are two separate zones with individual lights as follows:

Zone #1 contains four individual lights L1, L2, L3, L4;
Zone #2 contains five individual lights L5, L6, L7; L8, L9.
L5, L6, L7 are in Group #1 in Zone #2; and
L8, L9 are in Group #2 in Zone #2.

In this manner the lighting effects pointing to the ceiling would easily be changed independent of the lighting effects pointing down. It should be noted that there could be other group assignments in both zones. Each lighting controller recognizing its respective assigned zone address, group address and unit address for controlling its fixture.

Figure 5B:
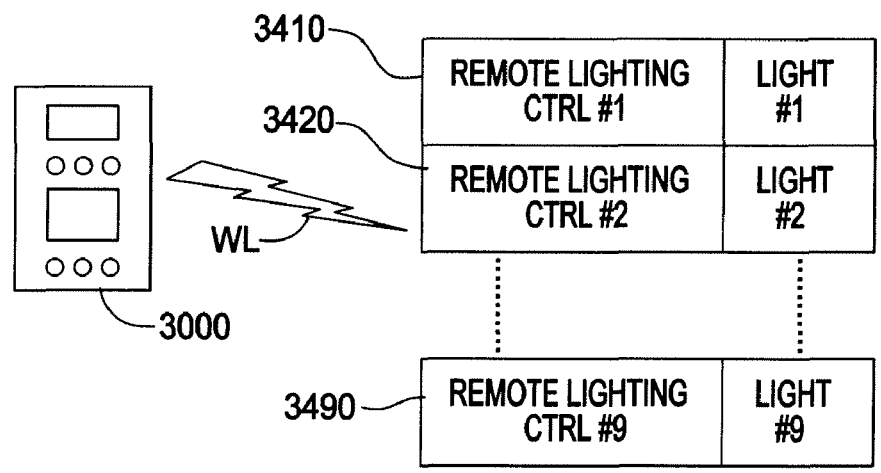
FIG. 5B is a diagram of a central remote control device sending control signals to remote controllers for the installation shown in FIG. 5A.

FIG. 5B is a diagram of a central remote control device sending control signals to remote light controllers for the zone shown in FIG. 5A. Thus, handheld remote control unit 3000 would send commands over wireless link WL to the individual light controllers for control of entire zones, a particular group in a zone or individual lights within a zone. Each remote light controller would decode received protocol packets to see if their zone, group or light address were enclosed and respond accordingly. It should be noted that the central controller 3000 would not require knowledge of how to control lighting but only send a command as to what is required at which time the remote light controllers would act accordingly.

Figure 6:
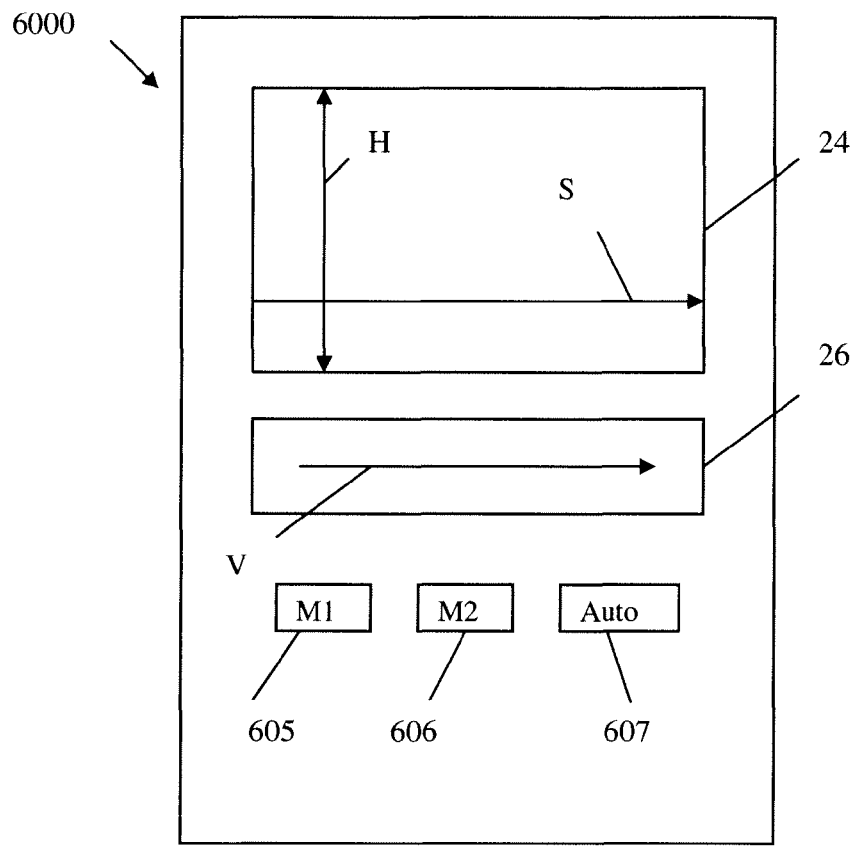
FIG. 6 is a simple remote controller to select hue, saturation, intensity and having color memory presets and a random color sequence button.

FIG. 6 is a simple remote controller 6000. Color spectrum selection area 24 allows the user to select hue and saturation (ref FIG. 2A). Intensity selection area 26 allows the user to select desired intensity (ref FIG. 2A). It should be noted that Intensity area 26 is shown along the horizontal axis whereas in FIG. 2A it is on a vertical axis. Memory presets M1 605, M2 606 allow a user to pre-select color (hue, saturation) and intensity whereas Auto select 607 triggers a random color sequence to occur.

FIG. 7 is an alternate embodiment design layout 7000 showing a circular touchpad area for hue and saturation selection on touchpad 23. Thru design choice many ways to execute a circular hue/saturation region exist. One way is a circular first touchpad with a x,y separate area for intensity, another is a circular region for color and a rectangular region for intensity. For this patent the terms circular touchpad input device conveys both a circular area on a rectangular touchpad or a circular touchpad. Color selection can be perceived as a circular set of zones radiating from a center of the circular touchpad area. One such color circle selection is Newton's color circle 76 circle, whereby saturation S increases from white W at its center to fully saturated at its outer peripheral surface. Color hue H varies about each circumference of Newton's color circle 76. For example, red R is fully saturated at the outer radius point R and blends thru pink as you approach the center point, which is white W. Going around the circumference outer edge as shown is Yellow Y, Red R, Magenta M, Blue B, Cyan C, Green G returning to Yellow Y. The selected color (hue, saturation) can be determined by the X/Y co-ordinate system, for example via look up tables. Packet generation from a circular Hue and Saturation region requires a conversion from a rectangular coordinate space (the touchpad) to a polar coordinate space (the Hue and Saturation region). After the touchpad has been scanned and the data included into an averaging buffer the average X and Y values may be converted into Hue and Saturation values via a mathematical algorithm known as Rectangular to Polar conversion. One such algorithm can be found at www.teacherschoice.com.au/Maths_Library/Coordinates/polar_-_rectangular_conversion.htm.

Any detected touch between $X_3$ and $X_4$ and between $Y_1$ and $Y_2$ would be a valid hue and saturation selection. Intensity V is shown as a rectangular area and is as described in FIG. 2A above, increasing from $Y_3$ to $Y_4$. Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. lighting control touch pad system comprising:
a variable color light source;
a computer having a control signal output to vary a hue, a saturation and an intensity of the variable color light source;
a two dimensional touch pad input device which sends a hue signal, a saturation signal and an intensity signal to the computer;
said hue and saturation signals derived from a first Cartesian axis coordinate and a second Cartesian axis coordinate of a touch on the touchpad in a color region of the touch pad input device;
said color region of the touch pad having a first Cartesian axis for a color spectrum (hue) in any chosen sequence of red, orange, yellow, green, cyan, blue and violet, each color represented within a colored overlay, and having a second Cartesian axis for minimal to maximum saturation levels of a selected color;

said color region of the touch pad having a color graphical overlay representing the colors of the color spectrum;

said intensity signal derived from an x and y coordinate of another touch in a separate intensity region apart from the color region of the touch pad input device; and wherein the computer scans the touch pad input device to determine the coordinates of the touch and the another touch and via an algorithm creates the control signal output.

2. The apparatus of claim 1, wherein the intensity region is oriented vertically.

3. The apparatus of claim 1 further comprising a plurality of variable color light sources, each light source having a microprocessor controller, a central light controller communicating control signals to each microprocessor controller, and a remote control unit housing the touchpad, the central controller and a plurality of selection switches, wherein the touchpad can individually control each member of the plurality of variable color light sources via a selection of a member of the plurality of selection switches.

4. The apparatus of claim 3, wherein the remote control unit further comprises a display showing an identity of the selected variable color light source, and the central controller further comprises preprogrammed light themes which can be shared by the variable color light sources via the plurality of selection switches.

5. The apparatus of claim 4, wherein the variable color light source further comprises a plurality of variable color light sources creating a zone(s).

6. The apparatus of claim 4, wherein a plurality of groups can be further designated into subcategories of the zones.

7. The apparatus of claim 3, wherein the remote control unit further comprises a selection switch to enable a preset condition of color/intensity at a selected variable color light source.

8. The system of claim 1, wherein the first Cartesian axis is an X axis, and the second Cartesian axis is a Y axis.

9. The system of claim 1, wherein the first Cartesian axis is a Y axis, and the second Cartesian axis is an X axis.

10. The apparatus of claim 8, wherein the y axis color sequence starting from the top of the color region is yellow, orange, red, violet, blue, cyan, green and yellow.

11. The apparatus of claim 9, wherein the x axis color sequence starting from the left of the color region is yellow, orange, red, violet, blue, cyan, green and yellow.

12. A lighting control touch pad system comprising:

a variable color light source;

a computer having a control signal output to vary a hue, a saturation and an intensity of the variable color light source;

a two dimensional circular touch pad color input area in a touch pad device which sends a hue signal, and a saturation signal to the computer;

said hue signal derived from a selection from a set of zones radiating from a center of the circular touch pad color input area;

said saturation signal derived from a selected radial distance from the center of the circular touch pad color input area;

said circular touch pad color input area of the touch pad device having a color graphical overlay representing the colors of the color spectrum;

said intensity signal derived from an x and y coordinate of another touch in a separate intensity area apart from the circular touch pad color area of the touch pad device; and wherein the computer scans the circular touch pad color input area and the separate intensity area and via an algorithm creates the control signal output.

13. The apparatus of claim 12, wherein a minimal saturation starts at the center of the circular touch pad color input area and the maximum saturation ends at a peripheral edge of the circular touch pad color input area.

\* \* \* \* \*